(12) United States Patent
Phillips et al.

(10) Patent No.: US 6,444,291 B2
(45) Date of Patent: *Sep. 3, 2002

(54) ROLLABLE ASPHALTIC PROTECTION COURSE

(75) Inventors: Aaron R. Phillips, Baxter Springs, KS (US); Andrew J. Parker, Joplin, MO (US)

(73) Assignee: Tamko Roofing Products, Inc., Joplin, MO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/918,898

(22) Filed: Aug. 27, 1997

(51) Int. Cl.$^7$ .................................................. B32B 5/16
(52) U.S. Cl. ........................ 428/143; 428/143; 428/148; 428/149; 428/903.3; 52/518; 52/555
(58) Field of Search ................ 428/143, 148, 428/149, 903.3; 52/518, 555

(56) References Cited

U.S. PATENT DOCUMENTS

| | | | |
|---|---|---|---|
| 2,187,203 A | 1/1940 | Johnston | 108/8 |
| 2,188,204 A | 1/1940 | Maro et al. | 134/51 |
| 2,196,469 A | 4/1940 | Moeller et al. | 92/3 |
| 2,203,173 A | 6/1940 | Moeller | 92/3 |
| 2,204,533 A | 6/1940 | Fischer | 94/18 |
| 2,219,714 A | 10/1940 | Sperry | 20/15 |
| 2,236,900 A | 4/1941 | Greider et al. | 92/21 |
| 2,263,824 A | 11/1941 | Burrell | 94/18 |
| 2,278,146 A | 3/1942 | Moeller | 154/45.9 |
| 2,290,420 A | 7/1942 | Fasold | 108/8 |
| 2,317,596 A | 4/1943 | Fischer | 154/2 |
| 2,326,723 A | 8/1943 | Fasold et al. | 154/51 |
| 2,326,724 A | 8/1943 | Fasold et al. | 154/51 |
| 3,886,021 A | * 5/1975 | Breckenfelder | 156/246 |
| 4,726,846 A | * 2/1988 | Jackson et al. | 521/40 |
| 5,488,807 A | * 2/1996 | Terrenzio et al. | 52/555 |
| 5,626,659 A | * 5/1997 | Chivers | 106/284.04 |

OTHER PUBLICATIONS

Specification Sheet for Elsro Petrotac—#240.
Celotex Article, *Carey–Tred Roof Walkway & Protection Course*.

* cited by examiner

Primary Examiner—William P. Watkins, III
(74) Attorney, Agent, or Firm—Fulbright & Jaworski L.L.P.

(57) ABSTRACT

A protection layer for use in a waterproofing or roofing system and a method for making the protection layer in a rollable form is disclosed. The protection layer includes a core matrix of felt and asphalt saturant typical in many roofing products. The protection layer also includes a unique coating applied to the matrix. The coating comprises a mixture of asphaltic waste, a relatively soft asphalt, and a filler. The addition of the coating to the matrix results in a product that is flexible enough to allow the product to be rolled without cracking, yet is sufficiently puncture and scuff resistant to adequately protect an underlying membrane.

6 Claims, 3 Drawing Sheets

ROLLABLE ASPHALTIC PROTECTION COURSE

BACKGROUND OF THE INVENTION

A. Field of the Invention

The invention relates to materials used as barriers to protect waterproofing or roofing membranes from damage during and after the installation of these membranes. More particularly, the invention concerns a protection course that may be delivered and stored in a rolled form that is made using scrap asphalt roofing.

B. Background

In the roofing and waterproofing industries, sheet membranes are often installed in areas where they are exposed to environments that can puncture, tear, or otherwise damage the integrity of the sheet. For example, waterproofing membranes are applied to almost all the below-grade portions of foundation walls, to plaza decks, and to bridge decks. A puncture of a waterproofing membrane can require costly excavation and extensive repair or replacement work on the damaged portion to restore the integrity of the waterproofing system. Generally, a protection course is installed above or adjacent to the membrane surface to prevent punctures and allow work to proceed above or adjacent to the membrane. Similarly, protection course is used above ground to protect membranes from damage at most construction sites.

Protection courses have been manufactured from a variety of materials including asphaltic and bituminous compositions. It is important that a protection course be strong and puncture resistant to help prevent damage to the underlying membrane. As such, protection courses have typically been manufactured as rigid boards. The boards are laid on top of, or adjacent to, the waterproof membrane in areas where the membrane installation is complete. Additional protection board is installed as more membrane is installed. An applicator cuts each board as required to completely cover and protect the installed membrane.

Protection boards are typically standard sizes, either three feet by five feet, or four feet by eight feet, and may be ⅛ or ¼ thick (which are standard sizes in the industry). The boards are stacked and sold as a unit. The maximum coverage area of a commercial unit of rigid protection board is 32 square feet, not accounting for the amount of useable board lost when cutting the board to fit an application.

A drawback to existing protection courses is that the rigid form of the boards makes transport and storage cumbersome. Installation of the rigid boards is inefficient. While waterproofing and roofing membranes may be rolled out or applied as liquid, the boards must be individually carried from the storage area resulting in additional labor and time. Also, during application, much of the useable protection board surface may be lost when the boards are trimmed to fit the application.

A separate problem in the roofing industry is the problem of how to dispose of waste materials from the production of new asphalt roofing products, and from the removal of used or scrap materials when asphalt shingles or similar roofing materials are removed from a roof.

Asphaltic roofing products typically include organic (felt) or inorganic (fiberglass) mat saturated with asphalt to make the roofing product waterproof to which additional protective coatings of asphalt and mineral surfacing are added. Shingles are produced in flat sheets or strips designed for ease of installation. Generally, the shingles include tabs, or cutouts, that provide flexibility and enhance the appearance of the portion of the shingle that is exposed after installation. To produce tabbed asphaltic shingles, a flat sheet or strip is manufactured and then cut and trimmed into final form which generates waste material. In the past, this waste material has not been reused in a marketable product and has presented a disposal problem.

Rolled roofing, that is similar in composition to asphaltic shingles, has been known in the industry. Roll roofing is usually applied to a substrate by a heating process or using adhesives. Rolled roofing is used on roofs and as siding. Recently, rolled roofing has been used as protection course.

It is difficult to use roll-roofing type products as protection course, since both the adhesive and hot-applied processes can have detrimental effects on waterproofing membranes and can result in costly membrane failures. Further, if the rolled product is not adhered it is subject to rolling up because of the asphalt "memory" of its rolled condition. Finally, the barrier can be displaced by construction traffic leaving the membrane exposed and subject to puncture

SUMMARY OF THE INVENTION

The present invention overcomes problems with the roofing and waterproofing industries by providing a protection course made of asphalt shingle and roofing scrap in a rolled form. The rolled protection course can be transported, stored, and used in an efficient manner by the roofing and waterproofing trades. In addition, the invention reduces disposal expense and new material costs by using waste materials.

More specifically, the invention reduces the time and labor involved with installation of a protection course. This is especially useful in labor-intensive waterproofing applications such as foundations, decks, and bridge decks. An applicator may easily follow the installation of membrane by unrolling the protection course as a barrier to preserve the membrane. As an area is completed, the applicator need only cut the end of the roll, and store the roll where his next application is to begin. Asphalt "memory" in the protection barrier is reduced hindering roll up after installation. As such, the use of adhesives or hot application is unnecessary with the rolled protection course of the present invention.

The rolled form of the protection course also increases the useable area per commercial unit. For example, while a commercial unit of rigid protection board generally covers at most 32 square feet, the rolled protection course of the current invention covers approximately 100 square feet in ⅛ inch thickness, and approximately 50 square feet in ¼ inch thickness. Thus while the overall size of a commercial unit of the rolled protection course is less than the size of a corresponding commercial unit of rigid board, the unit of rolled protection course provides greater coverage area.

DESCRIPTION OF ILLUSTRATIVE EMBODIMENTS

The product of the current invention includes a layer of felt. The felt may be a common felt in the roofing and waterproofing industry, and may be organic or inorganic.

Different gauges of felt may be used depending on the thickness of the desired end product. For instance, in one embodiment of the current invention 65 gauge felt may be employed to produce the rollable protection course having a nominal thickness of ¼ inch. In another embodiment, 40 gauge felt is used to produce the inventive rollable protection course having a nominal thickness of ⅛ inch. Other felts with varying thicknesses may be used, depending on the desired strength and flexibility of the final product.

The felt is impregnated with saturant asphalt. To form a matrix, it is understood in the roofing and waterproofing industries that the felt must be thoroughly and completely saturated for the best function. Ideally all of the surface area of the felt, and all of the openings between the fibers, will be coated by the saturant asphalt to produce a solid waterproof matrix. Soft asphalts have been most successful for this use. However, soft asphalts generally have a relatively low melting point, making the saturated felt ineffectual because it is easily scuffed and punctured. Therefore, at least one coating of a relatively hard asphaltic material is added. This makes the product suitable for storage, handling, and installation. This coating asphalt has a higher softening point and is more resistant to scuffing and puncture.

Figure 1:
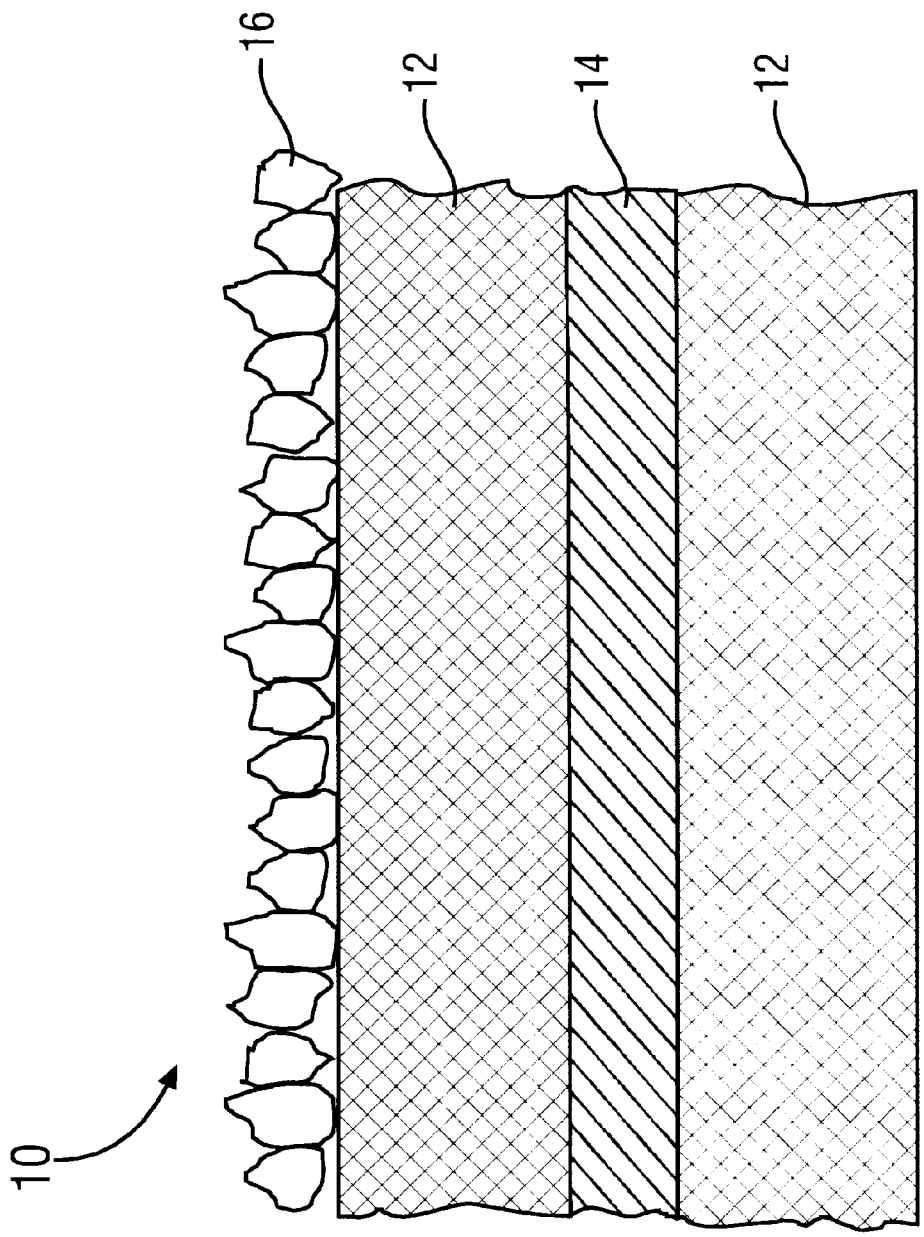
FIG. 1 is a cross-sectional view of the rollable asphaltic protection course.

Referring to FIG. 1, the rollable asphaltic protection course 10 of the current invention uses an original combination of roofing waste, filler, and asphalt to form a coating mixture 12. This mixture 12 is used to coat the saturated felt matrix 14 and produce a protection course or barrier that is distinct in its ability to roll without cracking and is highly resistant to puncture. Granular layer 16 may be added to the upper surface of the protection course 10 to act as a separation layer for the invention in its rolled form. Other suitable materials may be used as the separation layer.

Asphalt shingle waste, whether from clean scrap generated by production and cutting of new shingles or from used "tear off" shingles removed from failed or worn shingle roofs, vary in size and composition. The composition of the shingles is not considered of importance, because the asphalt felt and coating combination are relatively similar from shingle to shingle and manufacturer to manufacturer. The waste product incorporated may be other roofing waste that has similar composition to asphalt shingles, such as roll roofing.

The process of making the rollable protection course includes grinding, pulverizing, or otherwise reducing the roofing waste to a particle size that permits the roofing waste to be used in the new composition. Any type of conventional grinding mill, pulverizing equipment, or other grinding equipment can be used if the result is fine particles. Preferably the maximum size of the roofing waste particles after grinding is no greater than ½ inch. Grinding to a finer consistency, such as to essentially a powder, is acceptable and may enhance mixing.

A filler product added to the mixture increases flexibility in the final product. The filler also extends the amount of protection course produced using a given amount of waste. In one embodiment limestone may be used as the filler, although other common fillers in the roofing industry such as dolomite, fly ash, silica, granite, rhyolite, syenite, basalt, diabase, greenstone, slate, boiler slag, and others may be used.

Virgin asphalt, is included in the coating mixture. The virgin asphalt lowers the viscosity of the mixture. Roofing flux or other soft asphalts are preferred. Generally, the asphalt will be heated to a soft state before the waste particles and filler are added.

Asphalt roofing waste commonly contains a high percentage of coating grade asphalt which is relatively hard. If the coating grade asphalt is not tempered with the softer roofing flux or soft asphalt the protection course may crack when rolled. Accordingly, it is desirable to use a roofing flux that has a softening point approximately between 80 and 105 degree F. However, asphalts with softening points as high as 150 degrees F may be used.

The amount of waste, filler, and asphalt in the mixture is important in obtaining various characteristics. In one preferred embodiment the protection course includes about 53% reground asphalt roofing waste, about 27% new asphalt, and about 20% limestone filler. These percentages are given by way of an example of one possible mixture that can be used to produce a commercially acceptable product. It has been found that the listed percentages result in a coating for the protection course that allows the final product to be produced in a roll form, to roll and unroll at cool temperature, and to not become soft at higher temperatures. In general, a range of asphalt roofing waste between 45% and 60% is preferred, and a range of soft asphalt between 15% to 35%, with the remaining percentage being filler. However, a workable protection course may be created using a range of asphalt roofing waste between 1% and 70%.

Other percentages, and other fillers, will result in products having different characteristics of flexibility, puncture resistance, and temperature stability. These changes are necessary to meet the demands of many different applications. By varying the percentages, the current invention may be used for a variety of applications, each having its own particular mix of material capabilities.

After the proper percentages of ingredients are added, they are blended together. Any common mixing equipment can be used, however, it is beneficial to use a high shear mixer since the size of any remaining large waste particles may be reduced during mixing. The coating mixture should be at a substantially uniform temperature and a substantially uniform consistency when mixing is completed.

When the coating mixture is complete it is added to the saturated felt using a conventional manufacturing process, such as gravity dropping the coating onto the surface. The coating is spread or scraped to achieve the desired uniform thickness. Granules may be added for additional scuff resistance and thickness.

Next, the protection course is cooled and rolled. The product is typically manufactured in 36 inch wide rolls. The rolled protection course of the current invention covers 100 square feet in ⅛ inch thickness, and 50 square feet in ¼ inch thickness. The difference in coverage area is a result of a consistent roll size designed for ease of commercial handling and storage. The ¼ inch and ⅛ inch thickness roll will be a similar size and weight.

Figure 2:
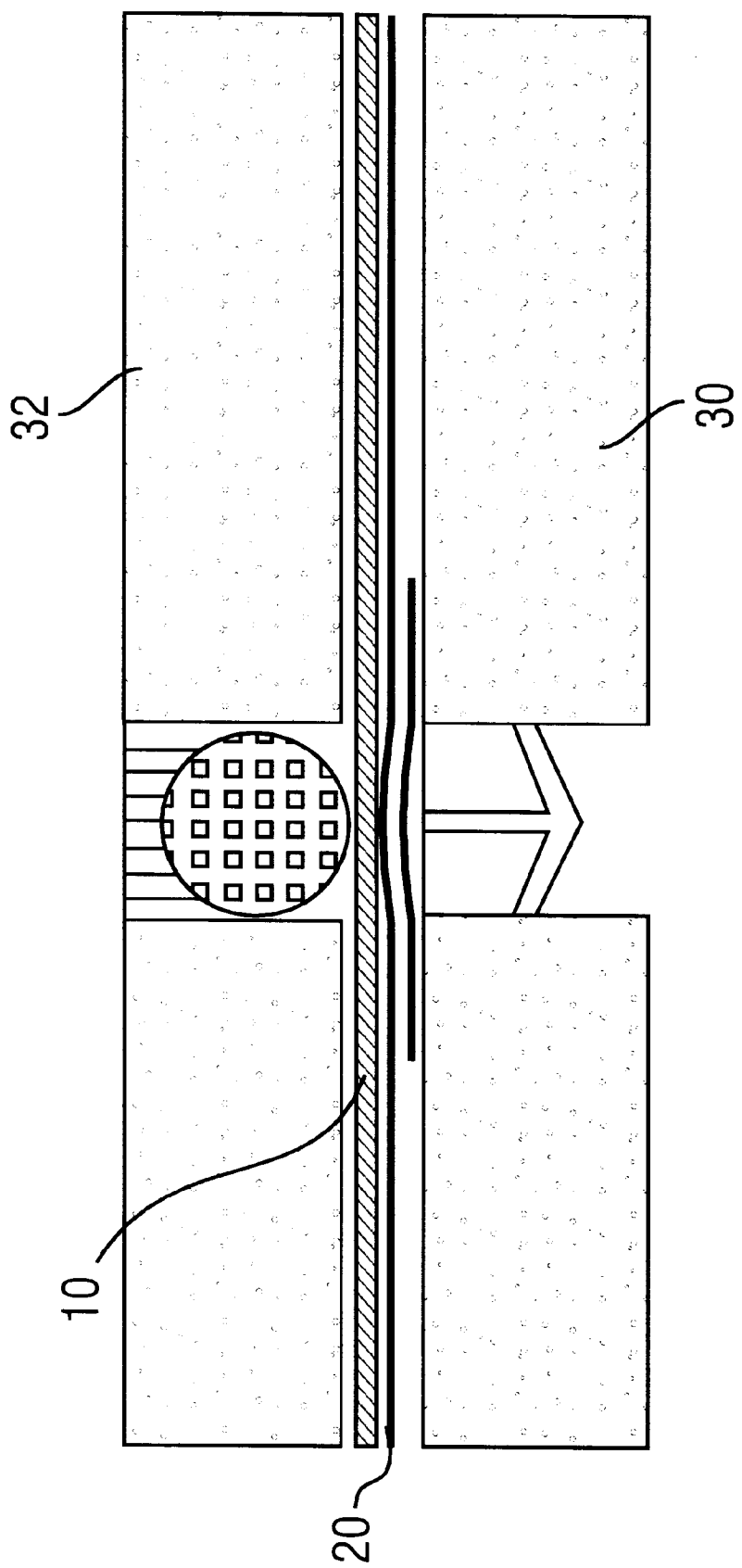
FIG. 2 is a cross-sectional view of a typical application of the invention.
Figure 3:
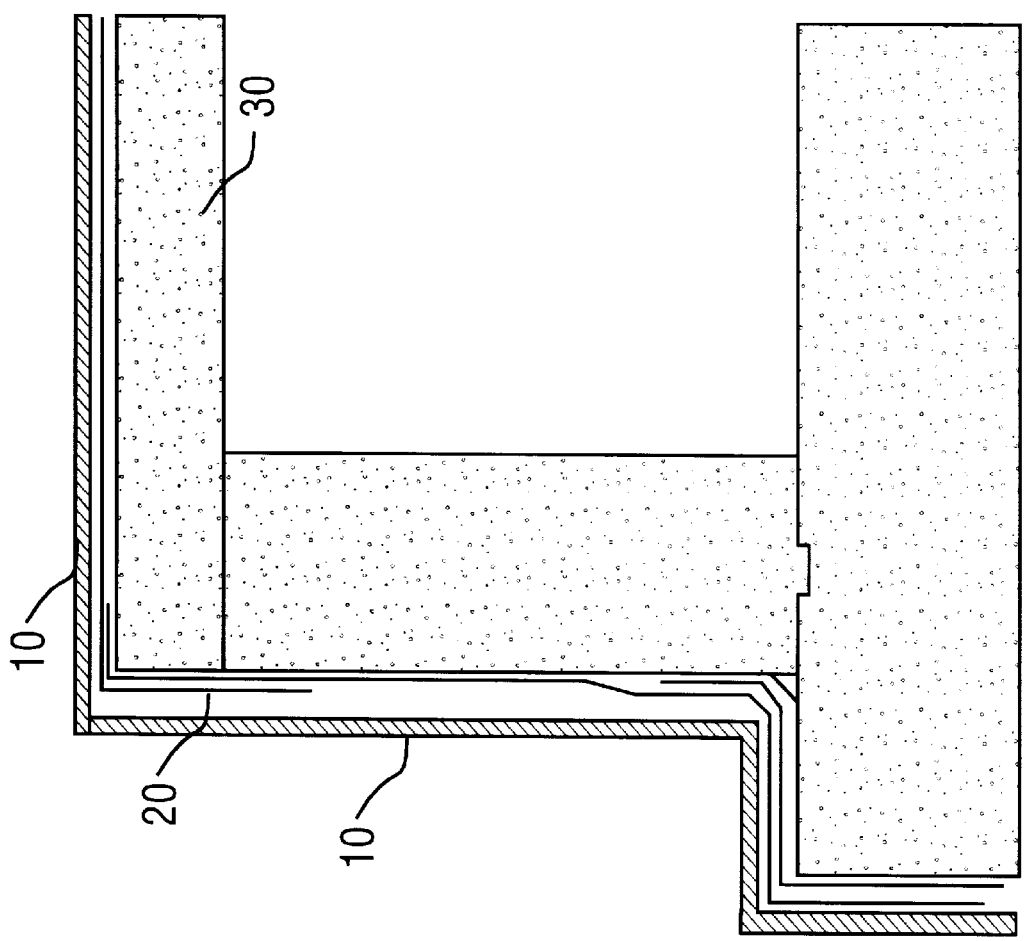
FIG. 3 is a cross-sectional view of another typical application of the invention.

As illustrated in FIG. 2, the protection course 10 of the present invention is utilized as part of a sheet waterproofing system in the same fashion as other commercially available protection courses. After sheet waterproofing 20 is adhered to the structure being waterproofed 30, protection course 10 is applied adjacent to waterproofing sheet 20 to protect the waterproofing sheet 20 from puncture caused by construction traffic, backfill, or the addition of topping structure 32. In the case of vertical waterproofing applications, as illustrated in FIG. 3, protection course 10 is attached directly to the surface of the waterproofing sheet 20 using any of a variety of adhesive materials, with asphalt-based adhesive a typical choice. The more common use for the disclosed protection course product is in horizontal waterproofing systems to prevent damage from construction traffic. In this application, the protection course is loose-laid on top of the sheet waterproofing membrane.

The description of the present invention is intended as examples of some embodiments of the invention and not as limitations. Many variations may be made to the embodiments disclosed without departing from the scope and spirit of the present invention. For example, while the above description is directed to a specific protection course composition having certain flexibility and softening characteristics, the present invention is applicable to the reuse of many forms of roofing waste to create protection course having varying characteristics. The present invention is intended to be limited only by the scope and spirit of the following claims.

What is claimed is:

1. A protection course comprising:
   a) a matrix, the matrix having two opposing sides and including a felt and a saturant asphalt applied to the felt;
   b) a coating applied to both sides of the matrix, the coating including a mixture of asphaltic waste material, a relatively soft asphalt having a softening point approximately between 80 and 150 degrees F., and a filler; and
   c) a granule material bonded to one said opposing side; where the protection course has a resistance to puncture, a resistance to roll memory, and a resistance to cracking when rolled.

2. The protection course of claim 1 wherein the asphaltic waste material is roofing particles.

3. The protection course of claim 2 wherein the roofing particles are ground.

4. The protection course of claim 2 wherein the coating is mixed using a high shear mixer or other mixer that reduces the roofing particles.

5. The protection course of claim 1 wherein the filler is limestone.

6. The protection course of claim 1 wherein the coating comprises:
   a) about 45% to 60% asphaltic roofing waste reduced into fine paricles;
   b) about 15% to35% soft asphalt; and
   c) about 5% to 40% filler.

* * * * *

UNITED STATES PATENT AND TRADEMARK OFFICE
CERTIFICATE OF CORRECTION

PATENT NO.    : 6,444,291 B2
DATED         : March 1, 2002
INVENTOR(S)   : Phillips et al.

It is certified that error appears in the above-identified patent and that said Letters Patent is hereby corrected as shown below:

Column 5,
Line 24, please delete "F.," and insert -- F, -- therefor.

Column 6,
Line 20, please delete "to35%" and insert -- to 35% -- therefor.

Signed and Sealed this

Twenty-second Day of April, 2003

JAMES E. ROGAN
*Director of the United States Patent and Trademark Office*